July 20, 1954     T. L. WILSON     2,684,433
VOLTAGE CONTROL FOR HIGH-FREQUENCY HEATING ELECTRODES
Filed Aug. 5, 1952     2 Sheets-Sheet 1

INVENTOR.
T. LAMONT WILSON
BY
Woodcock and Phelan
ATTORNEYS

July 20, 1954   T. L. WILSON   2,684,433
VOLTAGE CONTROL FOR HIGH-FREQUENCY HEATING ELECTRODES
Filed Aug. 5, 1952   2 Sheets-Sheet 2
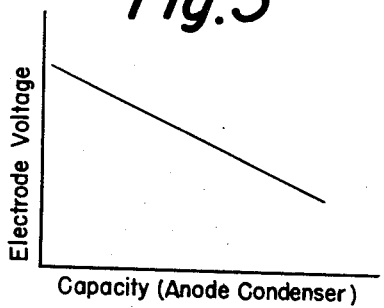
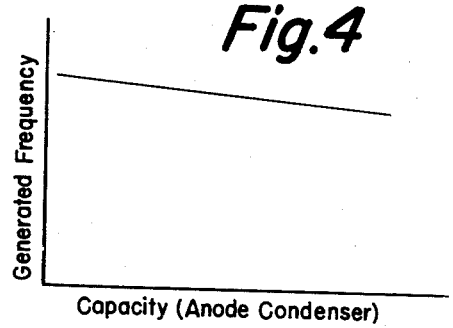
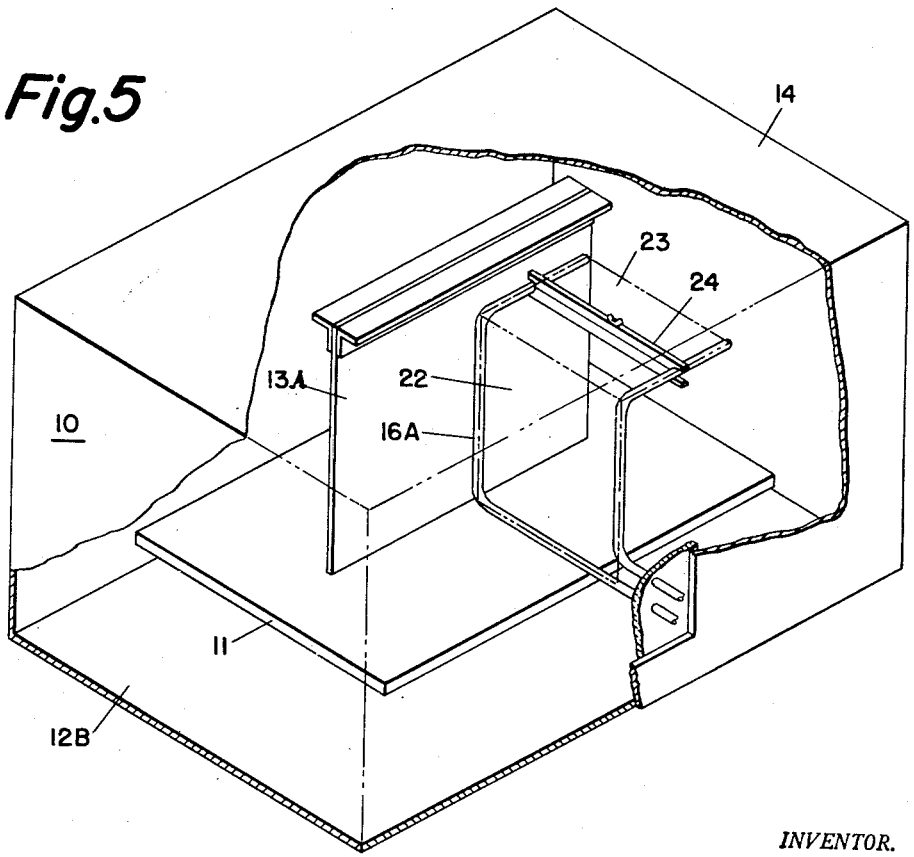
INVENTOR.
T. LAMONT WILSON
BY
Woodcock and Phelan
ATTORNEYS Patented July 20, 1954

2,684,433

UNITED STATES PATENT OFFICE 2,684,433

VOLTAGE CONTROL FOR HIGH-FREQUENCY HEATING ELECTRODES

Thomas Lamont Wilson, Lyndon, Ky., assignor, by mesne assignments, to National Cylinder Gas Company, Chicago, Ill., a corporation of Delaware Application August 5, 1952, Serial No. 302,721

9 Claims. (Cl. 219—10.77)

This invention relates to dielectric heating and particularly to control of the radio-frequency voltage available for heating of a dielectric load.

In accordance with the present invention, the work-heating electrodes provide the capacitance of a resonant heating circuit which is coupled to the anode circuit of an oscillator tube whose grid is connected to the heating circuit and the high-frequency voltage applied to the work is varied over a substantial range for any given electrode spacing or any given coupling between the anode and heating circuits by tuning the anode circuit within a range of frequencies for which there is sustained generation of oscillations.

More particularly, the anode circuit includes a loop or coil dimensioned and disposed to provide supraoptimum coupling between the anode and heating circuits in avoidance of change in heating voltage by changes in the characteristics of work being heated and to determine the upper limit of the tuning range of the anode circuit. The tuning of the anode circuit is effected either by a variable capacitor or by a variable inductor which physically may be part of the anode circuit loop but which is effectively decoupled from the heating circuit to minimize change of coupling with tuning.

The invention further resides in features of combination and arrangement hereinafter described and claimed.

For a more detailed understanding of the invention, reference is made to the accompanying drawings, in which:

Fig. 1 schematically illustrates a preferred form of the invention;

Figs. 2, 3 and 4 are explanatory figures; and

Fig. 5 is a simplified perspective view, in part broken away, of another form of the invention.

Figure 1:
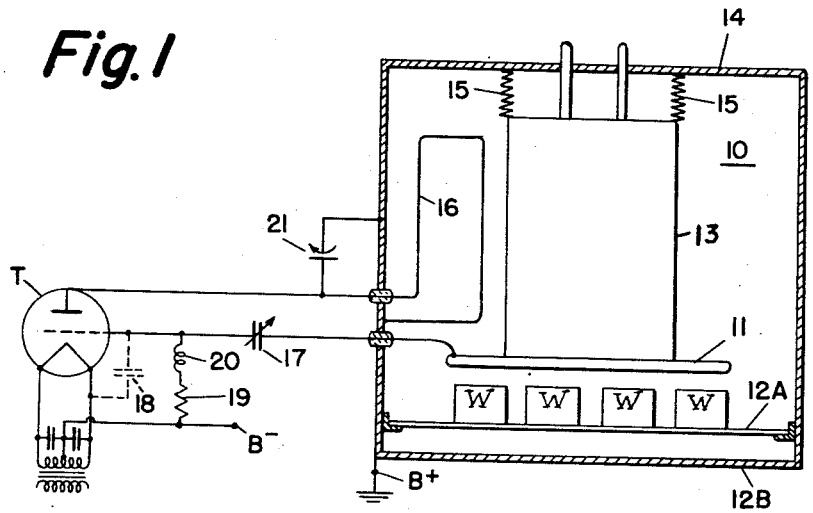

In the preferred arrangement shown in Fig. 1, the work W to be dielectrically heated is disposed within the metallic tunnel 10 between an upper heating electrode 11 and a lower electrode formed either by the metallic conveyor 12A or by the bottom wall 12B of the tunnel. The upper electrode 11 is connected to the lower free end of a metallic fin 13 whose upper end is connected to the top wall 14 of tunnel 10. Usually, flexible conductors 15 are interposed between electrode 11 or tunnel top 14 and the adjacent end of fin 13 to permit raising and lowering of the upper electrode 11.

In the illustrated embodiment the inductance of fin 13 provides the lumped inductance of a heating circuit resonated by the capacity between the heating electrodes, the return path between the upper end of the fin inductance and the bottom heating electrode being provided by the wall structure of the tunnel and being of negligible impedance. The tunnel walls also confine within the tunnel both the radio-frequency magnetic field which encircles the fin inductance 13 and the electric field between the heating electrodes. The tunnel 10, schematically shown in Fig. 1, is exemplary of any suitable resonant applicator construction including those shown in copending applications, Serial No. 138,628, filed January 14, 1950, now abandoned in favor of Warren application S. N. 419,633 filed March 26, 1954, and Serial No. 263,803, filed December 28, 1951.

The heating or tunnel circuit is suitably connected to the grid of oscillator tube T whose anode circuit includes a loop or coil 16 disposed within tunnel 10 above the heating electrode 11 and oriented to be threaded by the radio-frequency magnetic flux encircling the fin 13.

In the illustrated embodiment the grid of tube T is connected to electrode 11 through a capacitor 17 whose capacitance is selected or adjusted to be much less than the effective input capacity 18 of the tube. With such arrangement, more fully described and claimed in aforesaid application Serial No. 138,628, the capacity 18 has an effective value which inherently automatically varies with the tunnel loading so that the ratio of the two reactances of capacitor voltage-divider 17, 18 automatically varies with heating load and in proper sense to stabilize the grid excitation of the oscillator.

A path for the direct-current component of the grid excitation is provided by grid leak 19 and choke coil 20. Preferably, and as shown, the tunnel 10 is at ground potential for both direct current and high-frequency voltages.

Figure 2:
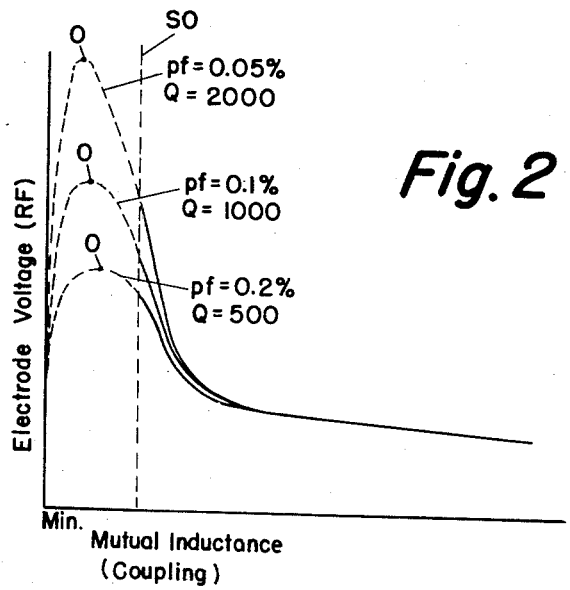

For reasons which later herein appear, the coil or loop 16 should provide supraoptimum coupling between the anode circuit of oscillator tube T and the heating or tunnel circuit 10. In explanation of what is meant by supraoptimum coupling, reference is made to Fig. 2 in which each of the three curves represents the variation of the voltage of electrode 11 with variation of the mutual inductance or coupling for a given work load in the tunnel or heating circuit. Specifically, the curves are for a tunnel circuit whose unloaded Q is well in excess of two thousand and whose effective Q and power factor have the values indicated in the figure for different loads. In each curve of Fig. 2, the maximum heating electrode voltage occurs at a point O termed the point of "optimum coupling" at which the effective resistance ($R_b$) reflected into the anode circuit of the tube is equal to the effective anode circuit resistance ($R_p$). The corresponding optimum mutual inductance ($M_0$) is given by the equation:

(1) $$M_0 = \sqrt{\frac{R_p}{2\pi}\frac{R_s}{f_0}}$$

where
$f_0$ = oscillator frequency
$R_p$ = anode circuit resistance
$R_s$ = effective series resistance of tunnel circuit The loop 16 should be of such dimensions and orientation that the coupling or mutual inductance is higher than optimum; i. e., supraoptimum, and is preferably in the region to the right of line SO, Fig. 2, where the electrode voltage does not excessively or rapidly change with variation of the effective power factor of the heating circuit as occasioned by the changes in the electrical characteristics of work during heating thereof.

With a resonant tunnel applicator as the heating circuit, supraoptimum coupling is readily obtainable since essentially all of the magnetic flux encircling the fin inductance 13 must pass through the space between the fin and the side walls of the tunnel and since the loop 16, of one or more turns, may be dimensioned and oriented to intercept a large percentage of the total flux.

As may be deduced from Fig. 2, the heating electrode voltage may be decreased by increasing the mutual inductance or coupling in the supraoptimum range. The voltage gradient through the work may also be decreased by spacing the upper electrode 11 from the work. However, both of these methods of controlling the dissipation of high-frequency power in the work have practical limitations. For example, when the upper electrode must apply pressure to the work, as in heating of wallboard or in tapeless splicing of veneers, it is not possible to control the voltage gradient through the work by lifting the upper electrode therefrom to different spacings. On the other hand, and particularly for higher power factor loads, the electrode voltage falls very slowly with increase of mutual inductance in the supraoptimum range. Also, rotation of the loop to vary the coupling introduces mechanical and electrical problems particularly when the loop is made of hollow conductors for traverse of cooling liquid for the tube anode.

In one aspect of the present invention the coupling between the anode circuit and the tunnel or heating circuit is permanently or adjustably fixed to be in the supraoptimum range, Fig. 2, and at a value therein which affords the maximum electrode voltage required for a particular heating use. Control of the voltage of electrode 11 and therefore the voltage gradient through the work, whether contacted by or spaced from the electrode, is varied by adjustment of capacitor 21 to tune the anode circuit of the oscillator tube through a range of operating frequencies whose upper limit ($F_h$) (other parameters remaining fixed) is determined by the minimum dimensions of coil 16 which provide supraoptimum coupling between the anode and heating circuits and whose lower limit ($F_l$) still provides sufficient grid excitation for sustained generation of oscillations. The maximum capacity setting of the condenser 21 should not tune the anode frequency below such lower limit as the oscillator tube may be seriously damaged. By provision of such tuning condenser and for any fixed value of supraoptimum coupling and of electrode spacing, the electrode or work voltage may be preset to any desired value throughout a wide range, for example, from 5,000 volts to 30,000 volts, to accommodate the requirements of different work loads. Since the coupling is in the supraoptimum range above SO, that voltage does not change excessively during a heating run due to change in the electrical characteristics of the work due to its heating, or in the case of a conveyor-fed tunnel, due to variation in the number of work pieces on the conveyor and between the electrodes.

Generally as indicated in Fig. 3, the electrode voltage is high for minimum capacity setting of capacitor 21 and smoothly decreases with increase of the capacity to its maximum value. Tests have indicated this relationship between electrode voltage and anode tuning capacity is true whether the frequency range $F_h$–$F_l$ be above, or below, or straddles the resonant frequency of the tunnel or heating circuit itself. As shown in Fig. 4, the frequency of the generated oscillations gradually decreases somewhat with increase of capacity of condenser 21 (other parameters remaining constant), but such frequency drop is relatively slight and does not significantly reduce the heating rate.

Less conveniently, the plate loop frequency may be varied over the range $F_h$ to $F_l$, as above defined, by an arrangement such as shown in Fig. 5 which uses a variable inductor instead of a variable capacitor. In the particular arrangement shown in Fig. 5, the anode circuit loop 16A has two sections, one of which has an area 22 threaded by the magnetic flux encircling the fin 13A and the other of which has an area 23 which is so oriented that although it is within the tunnel 10, it is not threaded by any appreciable amount of the fin flux. The frequency of the loop or coil 16A may be varied by sliding the shorting bar 24 along the last-named section of the loop so to change its inductance. Such change in position of the shorting bar does not, however, change the area of the loop which is threaded by the flux. Hence, the area 22 of the loop may be dimensioned to provide supraoptimum coupling between the anode and tunnel circuits and such chosen value of coupling is not significantly changed with change in position of the tuning slider. Accordingly, as with the arrangement shown in Fig. 1, the electrode voltage may be varied over a wide range for any given fixed spacing of the heating electrodes and for any given value of supraoptimum coupling by tuning the anode circuit over a range of frequencies for which there is sustained generation of oscillations.

It is, of course, to be understood that in both Figs. 1 and 5 the tunnel may be in inverted position, in which case the electrode 11 becomes the lower heating electrode.

Although a tunnel circuit is preferred because a work load of very low power factor, such as foam rubber mattresses, may be rapidly heated, the invention may be used to advantage with heating circuits using coil inductances provided, however, that the criteria above discussed can be made in any particular application.

What is claimed is:

1. In a dielectric heating system comprising an oscillator tube for supplying radio-frequency power to a dielectric work load disposed between spaced heating electrodes, a heating circuit connected to the grid of said tube comprising inductance resonated by the capacity between said heating electrodes, a loop in the anode circuit of said tube and coupled to said inductance to furnish radio-frequency power to said heating circuit for heating of the work and to provide the grid excitation for said tube, and means for varying the radio-frequency potential difference between said heating electrodes for fixed spacing of said electrodes and for fixed coupling of said loop comprising means for tuning said anode circuit through a range of frequencies for which said tube generates high-frequency power to heat the work between said electrodes.

2. A dielectric heating arrangement as in claim 1 in which said loop is dimensioned and positioned to provide supraoptimum mutual inductance between said loop and said heating circuit and is determinative of the upper limit of said range of frequencies, and in which said tuning means is a variable capacitor whose maximum capacitance provides sufficient grid excitation for sustained generation of oscillations and is determinative of the lower limit of said range of frequencies.

3. In a dielectric heating system comprising an oscillator tube for supplying radio-frequency power to a dielectric work load disposed between spaced heating electrodes, a heating circuit connected to the grid of said tube comprising inductance resonated by the capacity between said heating electrodes, a loop in the anode circuit of said tube and coupled to said inductance to provide supraoptimum mutual inductance between said anode circuit and said heating circuit, and means for varying the radio-frequency potential difference between said heating electrodes comprising means for tuning said anode circuit within a range of frequencies whose upper limit is fixed by loop dimensions required for aforesaid supraoptimum mutual inductance and whose lower limit insures sufficient grid excitation for continued generation of oscillations by said tube.

4. In a dielectric heating system comprising an oscillator tube for supplying radio-frequency power to a dielectric work load disposed between spaced heating electrodes, a heating circuit connected to the grid of said tube comprising inductance resonated by the capacity between said heating electrodes, a loop in the anode circuit of said tube and coupled to said inductance to provide supraoptimum mutual inductance between said anode circuit and said heating circuit, and means for varying the radio-frequency potential difference between said heating electrodes comprising a variable capacitor for tuning said anode circuit within a range of frequencies whose upper limit is fixed by the loop dimensions required for aforesaid supraoptimum mutual inductance and whose lower limit insures sufficient grid excitation of said tube for continued generation of oscillations.

5. In a dielectric heating system comprising an oscillator tube for supplying radio-frequency power to a dielectric work load disposed between spaced heating electrodes, a heating circuit connected to the grid of said tube comprising inductance resonated by the capacity between said heating electrodes, a loop in the anode circuit of said tube and coupled to said inductance to provide supraoptimum mutual inductance between said anode circuit and said heating circuit, and means for varying the radio-frequency potential difference between said heating electrodes comprising variable inductance in circuit with said loop and itself effectively decoupled from said heating circuit inductance for tuning said anode circuit through a range of frequencies.

6. In a dielectric heating system comprising an oscillator tube for supplying radio-frequency power to a dielectric work load disposed between heating electrodes, a metal tunnel having metallic fin structure internally extending from one wall of said tunnel and spaced from the remainder thereof to provide the lumped inductance of said tunnel and having one of said heating electrodes attached to said fin structure in spaced relation to all walls of said tunnel to provide lumped capacitance resonating said lumped inductance, a connection to the grid of said tube from said fin electrode assembly, a loop within said tunnel and in the anode circuit of said tube to provide supraoptimum mutual inductance between said tunnel and said anode circuit, and means for varying the radio-frequency potential difference between said heating electrodes comprising a variable capacitor for tuning said loop within a range of frequencies whose upper limit is fixed by the loop dimensions required for supraoptimum mutual inductance and whose lower limit insures sufficient grid excitation for continued generation of oscillations.

7. In a dielectric heating system comprising an oscillator tube for supplying radio-frequency power to a dielectric work load disposed between heating electrodes, a metal tunnel having metallic fin structure internally extending from one wall of said tunnel and spaced from the remainder thereof to provide the lumped inductance of said tunnel and having one of said heating electrodes attached to said fin structure in spaced relation to all walls of said tunnel to provide lumped capacitance resonating said lumped inductance, a connection to the grid of said tube from said fin electrode assembly, a loop within said tunnel and in the anode circuit of said tube to provide supra-optimum mutual inductance between said tunnel and said anode circuit, and means for varying the radio-frequency potential difference between said heating electrodes comprising a variable inductance for tuning said anode circuit through a range of frequencies, said variable inductance itself being effectively decoupled from said fin inductance.

8. In a dielectric heating system comprising a heating circuit having spaced heating electrodes coupled to the anode circuit of an oscillator tube and having a connection to the grid of said tube, the method of operation which comprises effecting fixed supraoptimum mutual inductance between said heating and anode circuits during dielectric heating of work between said electrodes, and varying the radio-frequency potential-difference between said electrodes by tuning the anode circuit within a range of frequencies for which there is sustained generation of oscillations by said tube.

9. A dielectric heating system comprising an oscillator tube for supplying radio-frequency power to a dielectric work load disposed between spaced heating electrodes; an applicator comprising an electrically conductive housing, inductance structure therein comprising a fin inductor projecting into the interior of said housing, spaced electrode structures cooperative to provide electric field space within the housing, one of which electrode structures cooperates with said fin inductor to form a fin-electrode assembly, said one electrode structure being disposed at the inwardly projecting end of said fin inductor in spaced relation to walls of the housing and electrically connected with wall structure of the housing through said fin inductor, said wall structure providing a low resistance, low reactance path completing a resonant circuit which includes said inductance structure and said electrode structures and the frequency of which is predominantly determined by the inductance of said inductance structure and the capacitance between said electrode structures; means providing an electrical connection between the grid of said tube and said fin-electrode assembly; a coupling loop in the anode circuit of said tube and disposed within said housing, said loop providing supraoptimum mutual inductance between said applicator and said anode circuit; and means for varying the radio-frequency potential difference between said electrode structures for fixed spacing thereof and for fixed coupling of said loop comprising means for tuning said anode circuit through a range of frequencies for which said tube generates high-frequency power to heat the work between said electrodes.

References Cited in the file of this patent

UNITED STATES PATENTS

| Number | Name | Date |
|---|---|---|
| 2,121,158 | Lindenblad | June 21, 1938 |
| 2,197,124 | Conklin | Apr. 16, 1940 |
| 2,215,582 | Goldstine | Sept. 24, 1940 |
| 2,465,102 | Joy | Mar. 22, 1949 |
| 2,488,545 | Lader | Nov. 22, 1949 |
| 2,504,109 | Dakin et al. | Apr. 18, 1950 |
| 2,529,717 | Wenger | Nov. 14, 1950 |